United States Patent
Katsumata (10) Patent No.: US 10,062,136 B2
(45) Date of Patent: Aug. 28, 2018

(54) RECORDING MEDIUM HAVING STORED IMAGE DISPLAY CONTROL PROGRAM, INFORMATION PROCESSING SYSTEM, AND IMAGE DISPLAY CONTROL METHOD

(71) Applicant: FUJITSU LIMITED, Kawasaki-shi, Kanagawa (JP)

(72) Inventor: Akira Katsumata, Oota (JP)

(73) Assignee: FUJITSU LIMITED, Kawasaki (JP)

( * ) Notice: Subject to any disclaimer, the term of this patent is extended or adjusted under 35 U.S.C. 154(b) by 597 days.

(21) Appl. No.: 14/548,348

(22) Filed: Nov. 20, 2014

(65) Prior Publication Data
US 2015/0156282 A1   Jun. 4, 2015

(30) Foreign Application Priority Data

Dec. 2, 2013   (JP) .................................. 2013-249561

(51) Int. Cl.
*G06F 15/16* (2006.01)
*G06T 1/20* (2006.01)

(52) U.S. Cl.
CPC ..................................... *G06T 1/20* (2013.01)

(58) Field of Classification Search
CPC ....................................................... G06T 1/20
USPC ......................................................... 709/203
See application file for complete search history.

(56) References Cited

U.S. PATENT DOCUMENTS

| | | | |
|---|---|---|---|
| 8,539,092 B2 * | 9/2013 | Hristodorescu | H04N 7/24 709/203 |
| 2008/0275961 A1 * | 11/2008 | Hoshino | G06F 3/1222 709/217 |
| 2008/0313348 A1 * | 12/2008 | Morris | H04L 9/0841 709/239 |
| 2009/0164655 A1 * | 6/2009 | Pettersson | H04L 65/4015 709/231 |
| 2009/0208062 A1 * | 8/2009 | Sorek | H04N 5/232 382/107 |
| 2010/0265353 A1 * | 10/2010 | Koyama | H04N 5/23232 348/222.1 |

(Continued)

FOREIGN PATENT DOCUMENTS

| | | |
|---|---|---|
| JP | 2010-220189 | 9/2010 |
| JP | 2011-238014 | 11/2011 |

*Primary Examiner* — Atta Khan
(74) *Attorney, Agent, or Firm* — Fujitsu Patent Center (57) ABSTRACT

The image display control program described below is stored on a recording medium. The program causes a client computer to execute a process including, detecting a stopping signal indicating that operations performed on an image have been stopped, performing control so as not to display images based on image data packets that are received after the detection, opening a second communication port that is different from a first communication port that communicates the image data packets, when the stopping signal is detected, transmitting, to a server via the first communication port, the stopping signal and port identification information of the second communication port, receiving, via the second communication port, a current still image corresponding to the stopping of the operations that the server transmits in response to the stopping signal, and displaying the current still image after an image that has been displayed immediately before the stopping of the operation.

6 Claims, 7 Drawing Sheets

(56) References Cited

U.S. PATENT DOCUMENTS

2011/0276653 A1* 11/2011 Matsui ................ H04N 19/176
                                                                                      709/217

* cited by examiner

RECORDING MEDIUM HAVING STORED IMAGE DISPLAY CONTROL PROGRAM, INFORMATION PROCESSING SYSTEM, AND IMAGE DISPLAY CONTROL METHOD

CROSS-REFERENCE TO RELATED APPLICATION

This application is based upon and claims the benefit of priority of the prior Japanese Patent Application No. 2013-249561, filed on Dec. 2, 2013, the entire contents of which are incorporated herein by reference.

FIELD

The embodiments discussed herein are related to a recording medium that has recorded an image display control program that enables a client device to use image information of a server device that is provided in a remote place via a network, an information processing system, and an image display control method.

BACKGROUND

Conventionally, a remote control technology is widely used in which a computer (server device) that is provided in a remote place on a network is operated using a computer at hand (client device). VNC (Virtual Network Computing) transmits image information of the server device to the client device using the RFB (Remote Frame Buffer) protocol, and displays the image information on a display screen of the client device.

As an example, the client device transmits operation information of a mouse, a keyboard, and the like, to the server device. The server device generates a moving image on the basis of the operation information. Then, the server divides the generated moving image into frames that are reproduction units at every fixed time (e.g., 0.1 second). The divided frames are sequentially converted into packets, but usually, a difference from a previous frame is converted into a packet. Then, the server device sequentially transmits the converted packets to the client device. The client device reproduces a moving image from the received packets, and displays the moving image on the display screen.

In addition, a technology is disclosed in which, in a thin client system that is constructed such that a client device has minimum functions and a server device manages resources, such as applications or files, an image in an image memory of the server device is divided into a plurality of regions, a frequency of change between frames is determined for each of the regions, a region in which the frequency of change exceeds a threshold value is identified as a high-frequency update region, a moving image compression process with a higher compression ratio is performed on the image of the identified region, and the image is transmitted (see, for example, Patent Document 1).

In addition, a technology is disclosed in which, in an image capturing device and a moving image distribution system capable of managing a construction site from a remote place by distributing a situation of a road construction site using a moving image, still images are extracted and generated that constitute a moving image at the time of receiving a still image transmission request signal in response to the still image transmission request signal (see, for example, Patent Document 2).

Patent Document 1: Japanese Laid-open Patent Publication No. 2011-238014

Patent Document 2: Japanese Laid-open Patent Publication No. 2010-220189

SUMMARY

According to an aspect of the invention, a recording medium having stored therein an image display control program has stored the image display control program as described below. The image display control program causes a client computer to execute the process as described below. The client computer transmits, to a server via a network, a signal of an operation performed on an image, sequentially receives, via the network, image data packets that the server generates on the basis of the signal of the operation, in response to acknowledgments, and displays images. The process includes: detecting a stopping signal indicating that a series of operations performed on the image have been stopped; performing control so as not to display images based on the image data packets that are received after the detection of the stopping signal; opening, between the server and the client computer, a second communication port that is different from a first communication port that communicates the image data packets, when the stopping signal is detected; transmitting, to the server via the first communication port, the stopping signal and port identification information of the second communication port; receiving, via the second communication port, a current still image corresponding to the stopping of the operations that the server transmits in response to the stopping signal; and displaying the current still image after an image that has been displayed immediately before the stopping of the operations.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, when screen data that is displayed by the client device is transmitted from the server device to the client device, a transmission delay sometimes occurs because a physical distance between the server device and the client device is long. In addition, a transmission delay sometimes occurs because congestion or the like occurs in a network between the server device and the client device. The transmission delay causes a delay in the drawing in the client device of the screen data that is transmitted from the server device, and therefore a response to an operation performed in the client device deteriorates.

Figure 1:
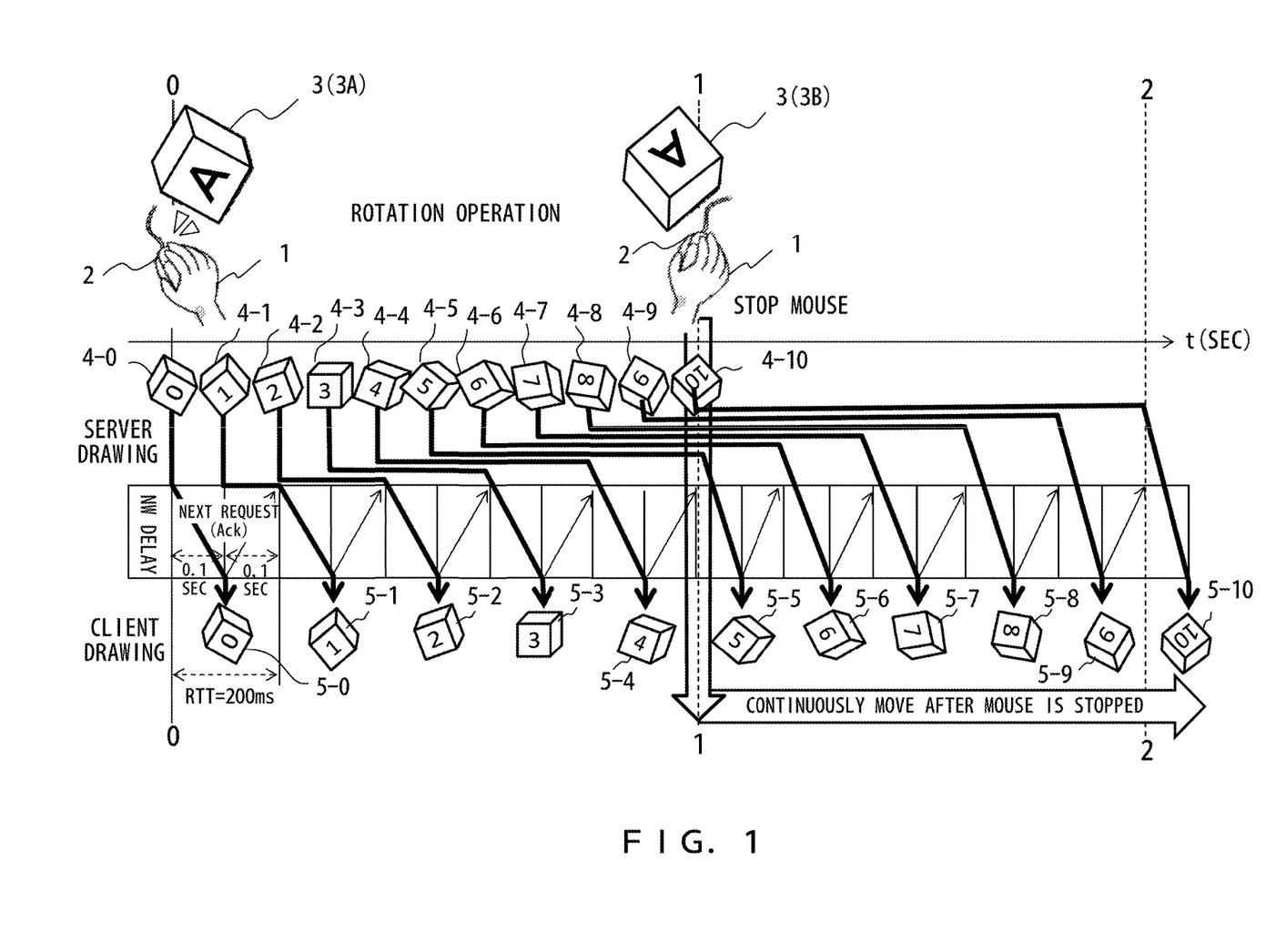
FIG. 1 is a diagram explaining a problem in a conventional technology.

FIG. 1 is a diagram explaining a problem in a conventional technology. In FIG. 1, a user 1 operates a drawing target object 3 using a mouse 2. The user 1 rotates the object 3 using the mouse 2 for one second when time t is from 0 second to 1 second. During this period, in the server device, object images 4-0 to 4-10 of the object 3A at the time of starting the rotation to the object 3B at the time of finishing the rotation due to the stopping of the mouse 2 are generated, at, for example, 0.1-second intervals. Here, the object images 4-0 to 4-10 correspond to the packets described above.

Then, the generated object images 4-0 to 4-10 are sequentially transmitted to the network in order to be transmitted to the client device. First, the first object image 4-0 is transmitted to the network, and arrives at the client device. It takes, for example, 0.1 seconds to arrive at the client device due to the transmission delay in the network.

When the object image 4-0 arrives at the client device, the client device generates and displays a display object image 5-0, and transmits an acknowledgment (Ack) indicating that the object image 4-0 has arrived, to the server device via the network. It also takes 0.1 seconds for the arrival of the acknowledgment. Therefore, it takes 0.2 seconds for the server device to transmit the object image 4-0 and to receive the acknowledgment of the object image 4-0.

When the client device receives the acknowledgment of the object image 4-0, the client device transmits the next object image 4-1 to the network. It similarly takes 0.2 seconds for the server device to transmit the object image 4-1 and to receive the acknowledgement of the object image 4-1.

As a result of repeating the processes above, the client device sequentially displays the display object images 5-0 to 5-10.

However, when the transmission delay of the network between the server device and the client device is great, even if the client device instructs the object 3 to stop the image display, a large number of images 4 will have already been transmitted to the network in the form of a packet, and it is impossible to stop the transmitted packets. In addition, when the acknowledgement is not received in the TCP/IP (Transmission Control Protocol/Internet Protocol) specification, a Network Interface Card (NIC) of the server device is not capable of transmitting a next packet, and therefore there is a problem wherein a phenomenon frequently occurs in which the movement of the object 3 is not stopped in the client device.

Figure 2:
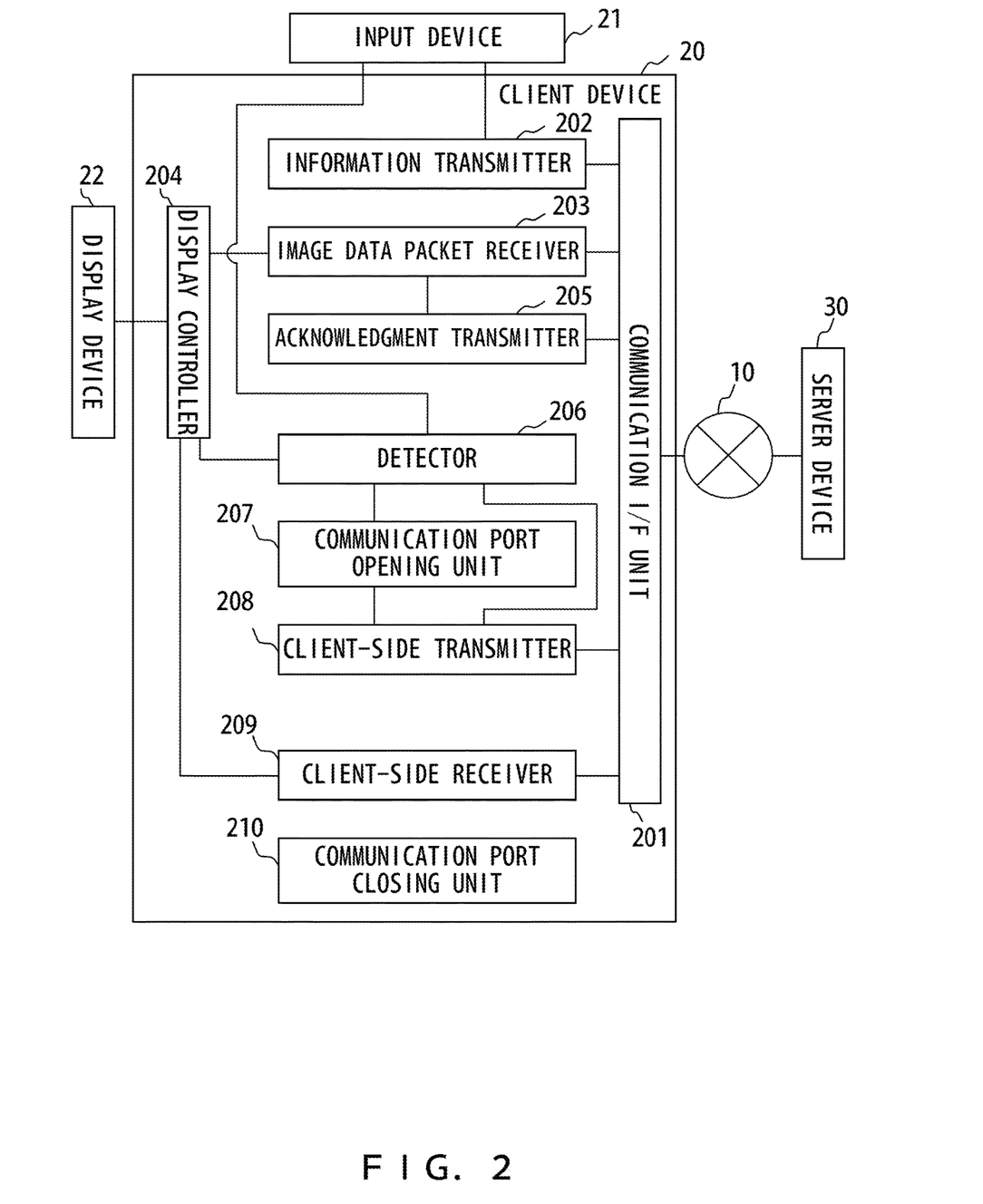
FIG. 2 illustrates a functional configuration of a client device according to the embodiments.

With reference to the drawings, the embodiments are described in detail. FIG. 2 illustrates a functional configuration of a client device according to the embodiments. In FIG. 2, the client device 20 is connected to a server device 30 in a remote place via a network 10.

To the client device 20, an input device 21 and a display device 22 are connected. The input device 21 is, for example, a keyboard device, a mouse, or the like, and is capable of inputting various types of information into the client device 20. The display device 22 is, for example, a liquid crystal display or the like, and is capable of displaying various types of information that the client device 20 has.

In addition, the client device 20 includes a communication I/F (Interface) unit 201, an information transmitter 202, an image data packet receiver 203, a display controller 204, an acknowledgement transmitter 205, a detector 206, a communication port opening unit 207, a client-side transmitter 208, a client-side receiver 209, and a communication port closing unit 210.

The communication I/F unit 201 is, for example, an NIC, a modem, or the like with a packet communication control function, and establishes a connection with the server device 30 via the network 10 and transmits/receives data.

The information transmitter 202 transmits information, such as a command to an application executed in the server device 30, to the server device 30 via the network 10 using the communication I/F unit 201.

The image data packet receiver 203 sequentially receives image data packets that the server device 30 generates on the basis of the information transmitted by the information transmitter 202, from the server device 30 via the network 10 using the communication I/F unit 201.

The display controller 204 performs control to generate image data on the basis of the image data packet that the image data packet receiver 203 has received, and to display the image data on the display device 22.

The acknowledgement transmitter 205 transmits an acknowledgement indicating that the image data packet receiver 203 has received the image data packet, to the server device 30 via the network 10 using the communication I/F unit 201.

As a result of repeating the reception of the image data packet by the image data packet receiver 203, the transmission of the acknowledgement by the acknowledgement transmitter 205, and the display control of the image data by the display controller 204, a moving image is displayed on the display device 22. The transmission of the information by the information transmitter 202, and the repetition of the reception of the image data packet by the image data packet receiver 203, the transmission of the acknowledgement by the acknowledgement transmitter 205, and the display control of the image data by the display controller 204 are similar to those in the conventional technology.

The detector 206 detects whether an input operation into the input device 21 of the information transmitted by the information transmitter 202 has been stopped. For example, the detector 206 detects whether an operation of the mouse, which is the input device 21, has been stopped.

The display control unit 204 controls the display device 22 to not display a moving image based on the image data packets that are received after the detection by the detector 206.

The communication port opening unit 207 opens a second communication port that is different from a first communication port that has communicated the image data packets with the server device 30, on the basis of the detection by the detector 206.

The client-side transmitter 208 transmits an input device stopping signal based on the detection by the detector 206 and port identification information of the second communication port, to the server device 30 via the first communication port.

The client-side receiver 209 receives a current still image that the server device 30 transmits in response to the input device stopping signal from the server device 30 through the second communication port via the network 10 using the communication I/F unit 201. The current still image refers to a final still image of a series of moving images that receives the input device stopping signal.

When the client-side receiver 209 receives the current still image, the display controller 204 performs control to display the current still image after a moving image that the display device 22 has displayed immediately before the detection by the detector 206.

Figure 3:
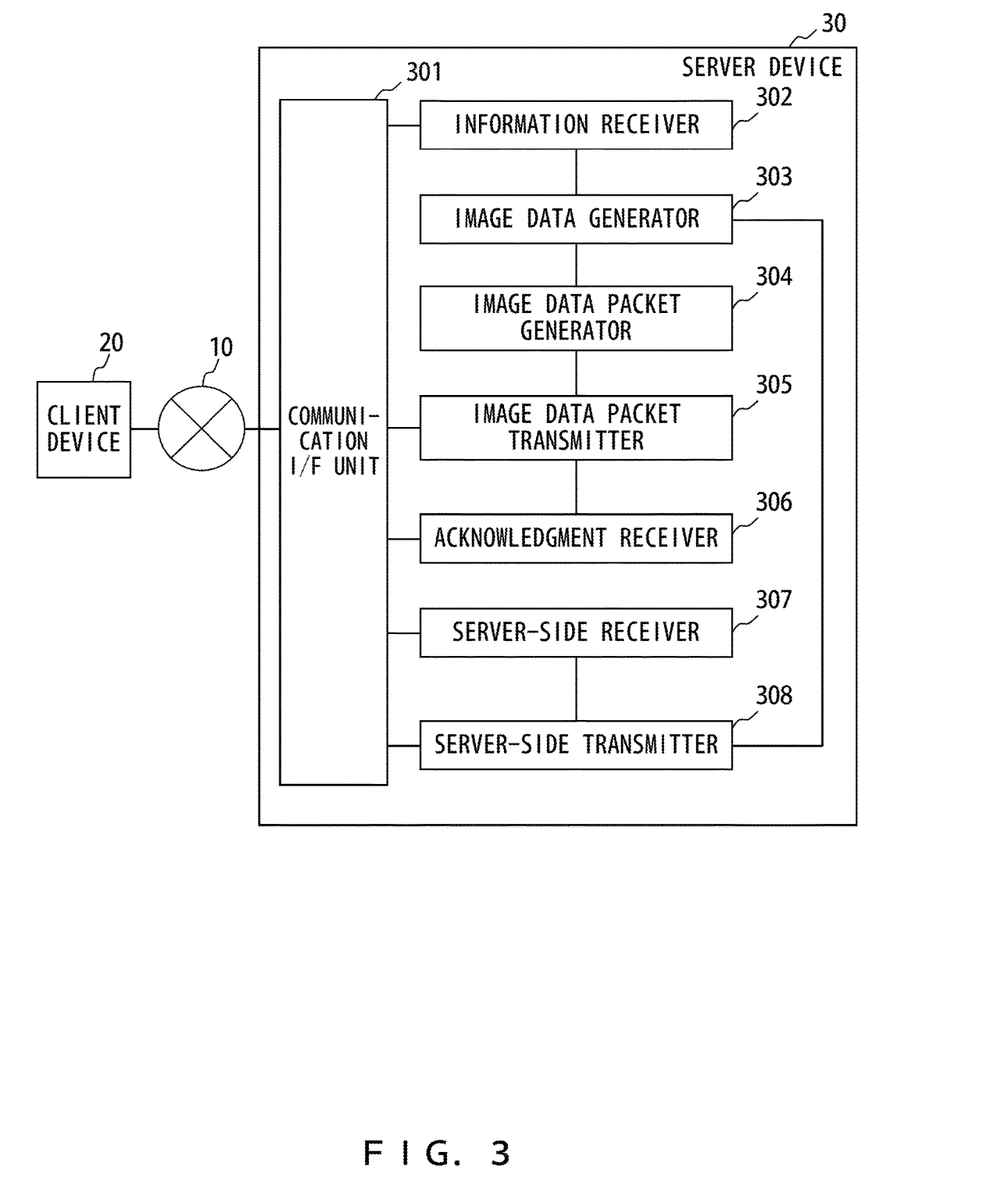
FIG. 3 illustrates a functional configuration of a server device according to the embodiments.

When the display controller 204 displays the current still image, the communication port closing unit 210 closes the second communication port that the communication port opening unit 207 has opened. FIG. 3 illustrates a functional configuration of the server device according to the embodiments. In FIG. 3, the server device 30 is connected to the client device 20 in a remote place via the network 10.

The server device 30 includes a communication I/F unit 301, an information receiver 302, an image data generator 303, an image data packet generator 304, an image data packet transmitter 305, an acknowledgment receiver 306, a server-side receiver 307, and a server-side transmitter 308.

The communication I/F unit 301 is, for example, an NIC, a modem, or the like with a packet communication control function, establishes a connection with the client device 20 via the network 10, and transmits/receives data.

The information receiver 302 receives information that has been transmitted from the client device 20 via the network 10 using the communication I/F unit 301.

The image data generator 303 generates image data on the basis of the information that the information receiver 302 has received. For example, the image data generator 303 generates a moving image that shows the rotation of a drawing target object on the basis of information corresponding to the operation of the mouse.

The image data packet generator 304 generates image data packets on the basis of the image data that the image data generator 303 has generated. For example, the image data packet generator 304 divides the generated moving image into frames, and data-converts the divided frames so as to generate the image data packets.

The image data packet transmitter 305 transmits the image data packets that the image data packet generator 304 has generated to the client device 20 via the network 10 using the communication I/F unit 301. The image data packet transmitter 305 sequentially transmits second or succeeding image data packets in response to acknowledgments from the client device 20 that the acknowledgment receiver 306 receives, as described below.

The acknowledgment receiver 306 transmits the acknowledgment indicating that the client device 20 has receives the image data packet to the client device 20 via the network 10 using the communication I/F unit 301.

The server-side receiver 307 receives the input device stopping signal and the port identification information from the client device 20 via the network 10 using the communication I/F unit 301.

The server-side transmitter 308 transmits a current still image at the time of the reception of the input device stopping signal by the server-side receiver 307 to the client device 20 through the second communication port via the network 10 using the communication I/F unit 201.

Figure 4:
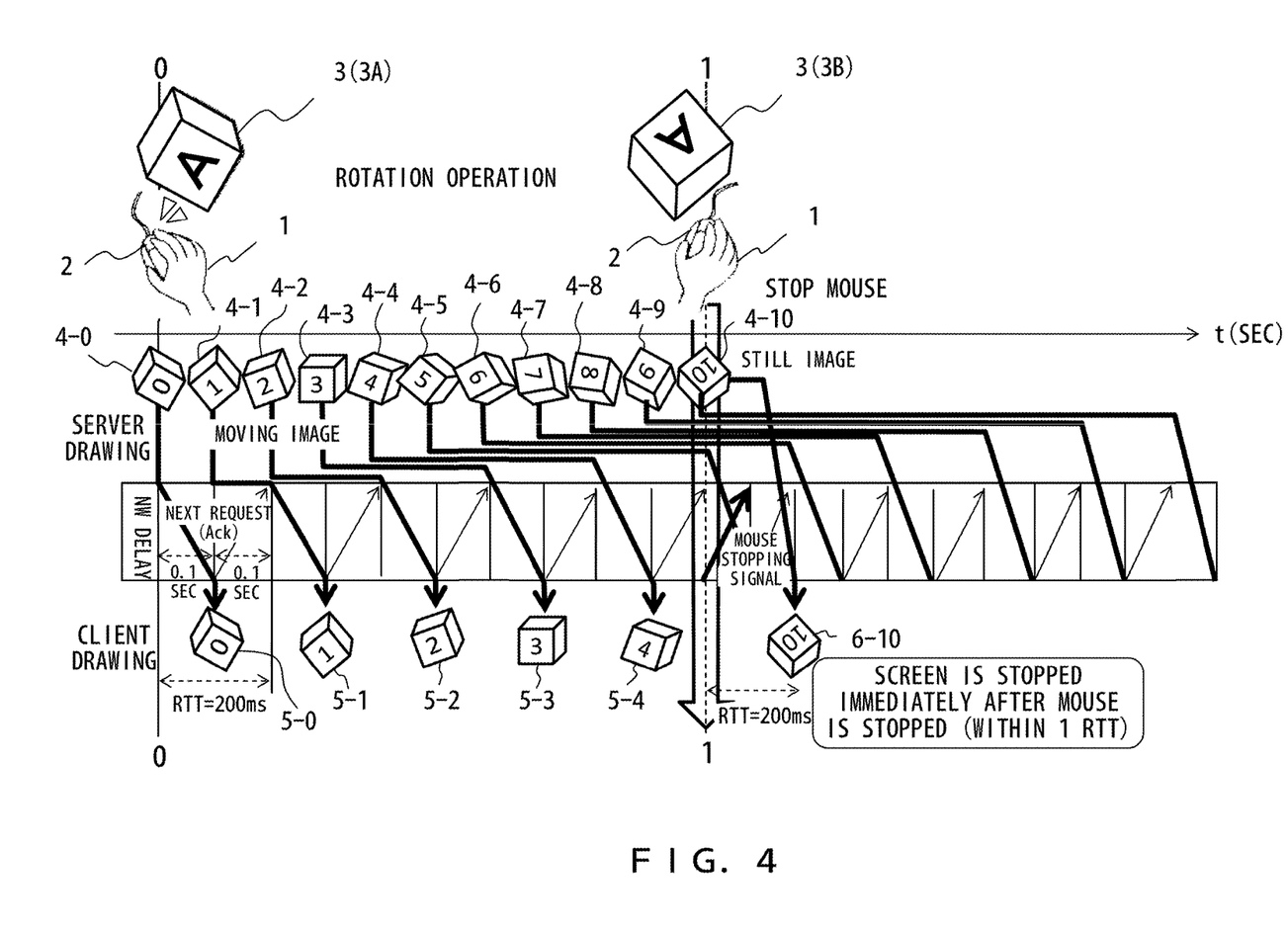
FIG. 4 is a diagram explaining the entirety of the embodiments.

FIG. 4 is a diagram explaining the entirety of the embodiments. In FIG. 4, the user 1 operates the drawing target object 3 using the mouse 2, which corresponds to the input device 21. The user 1 rotates the object 3 using the mouse 2 for one second when time t is from 0 second to 1 second. During this period, in the server device 30, the object images 4-0 to 4-10 of the object 3A at the time of starting the rotation to the object 3B at the time of finishing the rotation due to the stopping of the mouse 2 are generated at, for example, 0.1-second intervals. Here, the object images 4-0 to 4-10 correspond to pieces of packet data that are generated by converting frames constituting a moving image, or differences from pieces of packet data of the previous frames.

Then, the generated object images 4-0 to 4-10 are sequentially transmitted to the network 10 in order to be transmitted to the client device 20. First, the first object image 4-0 is transmitted to the network 10, and arrives at the client device 20. It takes, for example, 0.1 seconds to arrive at the client device 20 due to the transmission delay of the network 10.

When the object image 4-0 arrives at the client device 20, the client device 20 generates the display object image 5-0 and displays the display object images 5-0 on the display device 22, and transmits, to the server device 30 via the network 10, an acknowledgment indicating that the object image 4-0 has arrived. It also takes 0.1 seconds for the arrival of the acknowledgment. Therefore, it takes 0.2 seconds for the server device 30 to transmit the object image 4-0 and to receive the acknowledgment of the object image 4-0.

When the client device 20 receives the acknowledgment of the object image 4-0, the client device 20 transmits the next object image 4-1 to the network 10. It similarly takes 0.2 seconds for the server device 30 to transmit the object image 4-1 and to receive an acknowledgment of the object image 4-1.

As a result of repeating the processes above, the client device 20 sequentially displays the display object images 5-0 to 5-10. However, at a point in time at which the user 1 stops the rotation operation of the mouse 2 (time t is 1 second), the display object image 5-4 has been displayed, and the display object images 4-5 to 4-10 have been transmitted to the network 10 in the form of a packet. At this point, the client device 20 transmits an acknowledgment (Ack) to the server device 30 without drawing the display object images 5-5 to 5-10 that the client device 20 has received after the stopping of a series of operations of the mouse 2. The client device 20 opens a dedicated communication port, and issues, to the server device 30, an instruction to transmit, via the dedicated communication port, a current still image 6-10, which is a final still image of a series of moving images. The client device 20 receives the current still image 6-10 via the dedicated communication port. As a result, even if the transmission delay occurs in the network 10, the user 1 of the client device 20 can view the current still image 6-10, a final still image of the series of moving images, immediately, for example within 1 RTT (Round Trip Time) after the mouse is stopped. Therefore, the cloud operation of a design tool, such as a CAD, in a remote place (a desktop operation by a remote connection) can be used by preventing the delay due to the mouse stopping operation and so as to improve an operating sense.

Figure 5:
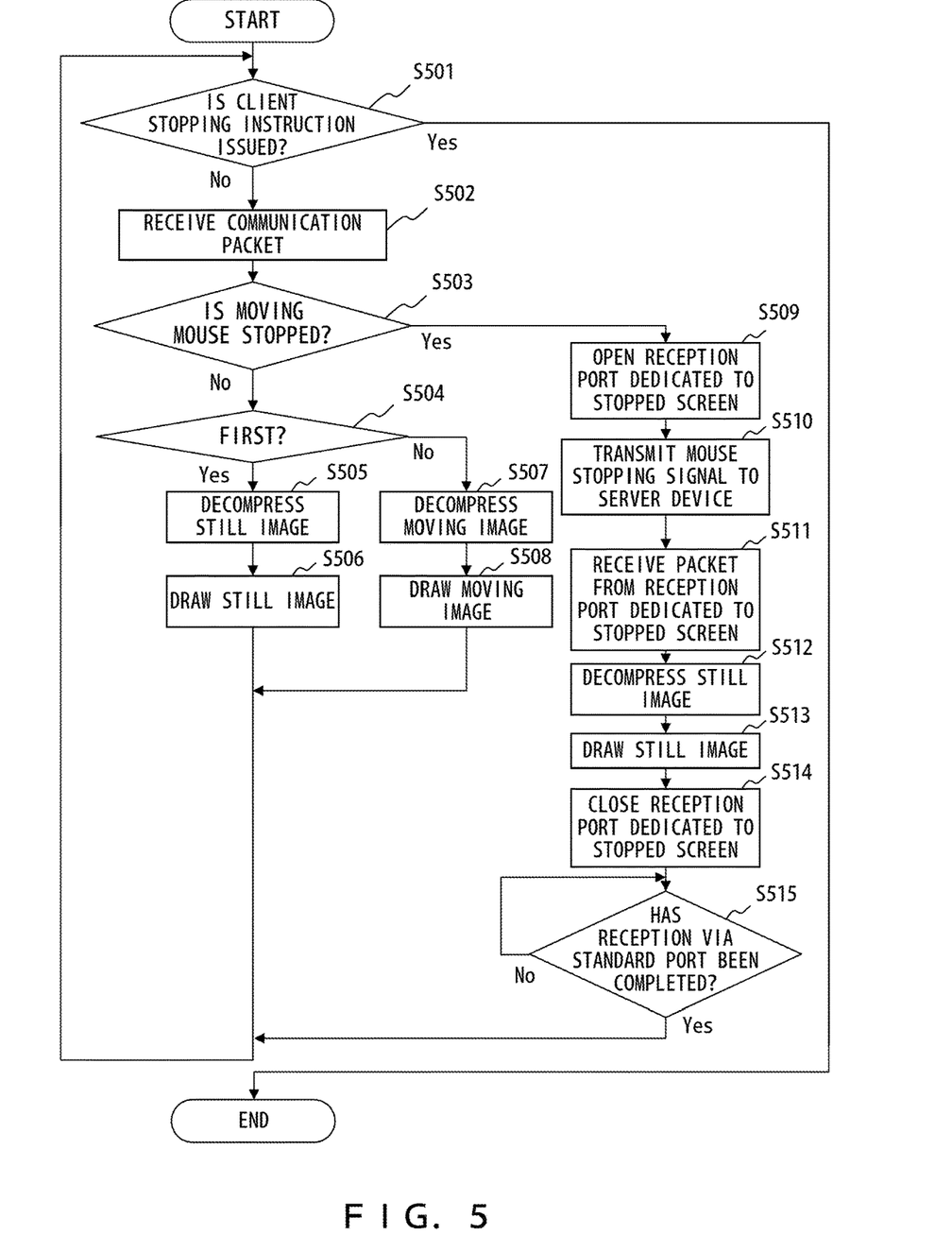
FIG. 5 is a flowchart illustrating a flow of an image display control process performed by the client device.
Figure 6:
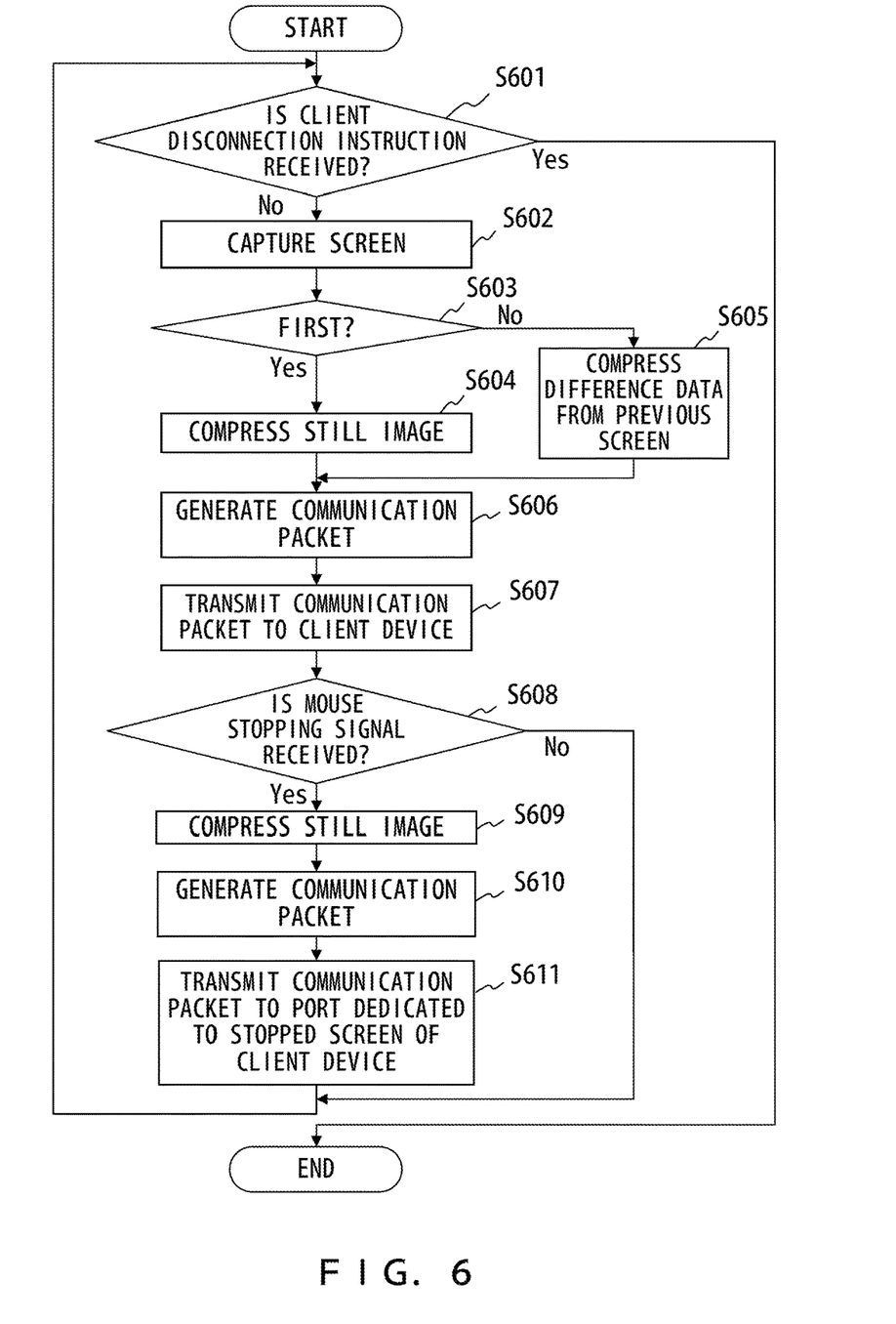
FIG. 6 is a flowchart illustrating a flow of an image display control process performed by the server device.

FIG. 5 is a flowchart illustrating a flow of an image display control process performed by the client device. FIG. 6 is a flowchart illustrating a flow of an image display control process performed by the server device.

As described above, the client device 20 and the server device 30 are connected to each other via the network 10. In this state, the client device 20 and the server device 30 perform the image display control process.

First, in step S501 of FIG. 5, it is determined whether the client device 20 transmits, to the server device 30 in a remote place, an instruction to finish a remote operation of an application executed in the server device 30.

When a finishing instruction is transmitted (step S501: Yes), the client device 20 finishes the image display control process. Then, in step S601 of FIG. 6, it is determined whether the server device 30 receives, from the client device 20, the finishing instruction of the remote operation. When the server device 30 receives the finishing instruction (step S601: Yes), the server device 30 finishes the image display control process.

On the other hand, when the server device 30 does not receive the finishing instruction of the remote operation (step S601: No), in step S602, the server device 30 captures, as a still image, a screen of the moving image that has been generated in the server device 30.

In step S603, it is determined whether the still image captured in step S602 is a first still image. When the captured still image is the first still image (step S603: Yes), the captured still image is compressed together with data indicating that the captured still image is the first still image. On the other hand, when the captured still image is not the first still image, namely, when the captured still image is a second or succeeding still image (step S603: No), in step S605, difference data from the previous screen is compressed.

In step S606, an image data packet for communication is generated on the basis of the still image data compressed in step S604 or S605. Then, in step S607, the image data packet generated in step S606 is transmitted to the client device 20.

When the finishing instruction of the remote operation is not transmitted in step S501 of FIG. 5 (step S501: No), in step S502, the client device 20 receives the image data packet that the server device 30 has transmitted in step S607 of FIG. 6.

Then, in step S503, it is determined whether the movement operation of the mouse 2, which is the input device 21, is stopped. When the movement operation is not stopped (step S503: No), in step S504, it is determined whether the image data packet received in step S502 is the image data packet based on the still image that was first captured in step S602.

When the image data packet received in step S502 is the first captured still image (step S504: Yes), the compressed data is decompressed in step S505, and the decompressed data is displayed on the display device 22 in step S506. On the other hand, when the image data packet received in step S502 is not the first captured still image (step S504: No), the compressed data is decompressed into a moving image following the previous screen in step S507, and the moving image following the previous screen is displayed on the display device 22.

Then, the process is returned to step S501, and the processes above are repeated. In addition, the server device 30 has not received, from the client device 20, a signal indicating that the movement operation of the mouse, which is the input device 21, has been stopped (step S608: No), and therefore the process is returned to step S601, and the processes above are repeated.

When it is determined in step S503 that the movement operation of the mouse 2, which is the input device 21, has been terminated (step S503: Yes), in step S509, a communication port dedicated to a stopped screen is opened that is different from a communication port (standard port) that has communicated the image data packets with the server device 30. Then, in step S510, a signal indicating that the movement operation of the mouse 2 has been stopped is transmitted to the server device 30.

Then, it is determined in step S608 of FIG. 6 whether the server device 30 receives, from the client device 20, the signal indicating that the movement operation of the mouse 2, which is the input device 21, has been stopped. When the server device 30 does not receive the signal (step S608: No), the process is returned to step S601. On the other hand, when the server device 30 receives the signal indicating that the movement operation of the mouse 2 has been stopped (step S608: Yes), a current still image is compressed in step S609. In step S610, an image data packet for communication is generated on the basis of still image data compressed in step S609. Then, in step S611, the image data packet generated in step S610 is transmitted to the communication port dedicated to the stopped screen that the client device 20 has opened in step S509 of FIG. 5, and the process is returned to step S601.

In step S511 of FIG. 5, the client device 20 receives the image data packet of the current still image that the server device 30 has transmitted in step S611. Then, the compressed data is decompressed in step S512, and the decompressed data is displayed on the display device 22 in step S513.

In step S514, the communication port dedicated to the stop screen that has been opened in step S509 is closed. Then, in step S515, it is determined whether the reception of the image data packets via the standard port has been completed. When it is determined that the reception has been completed (step S515: Yes), the process is returned to step S501.

Figure 7:
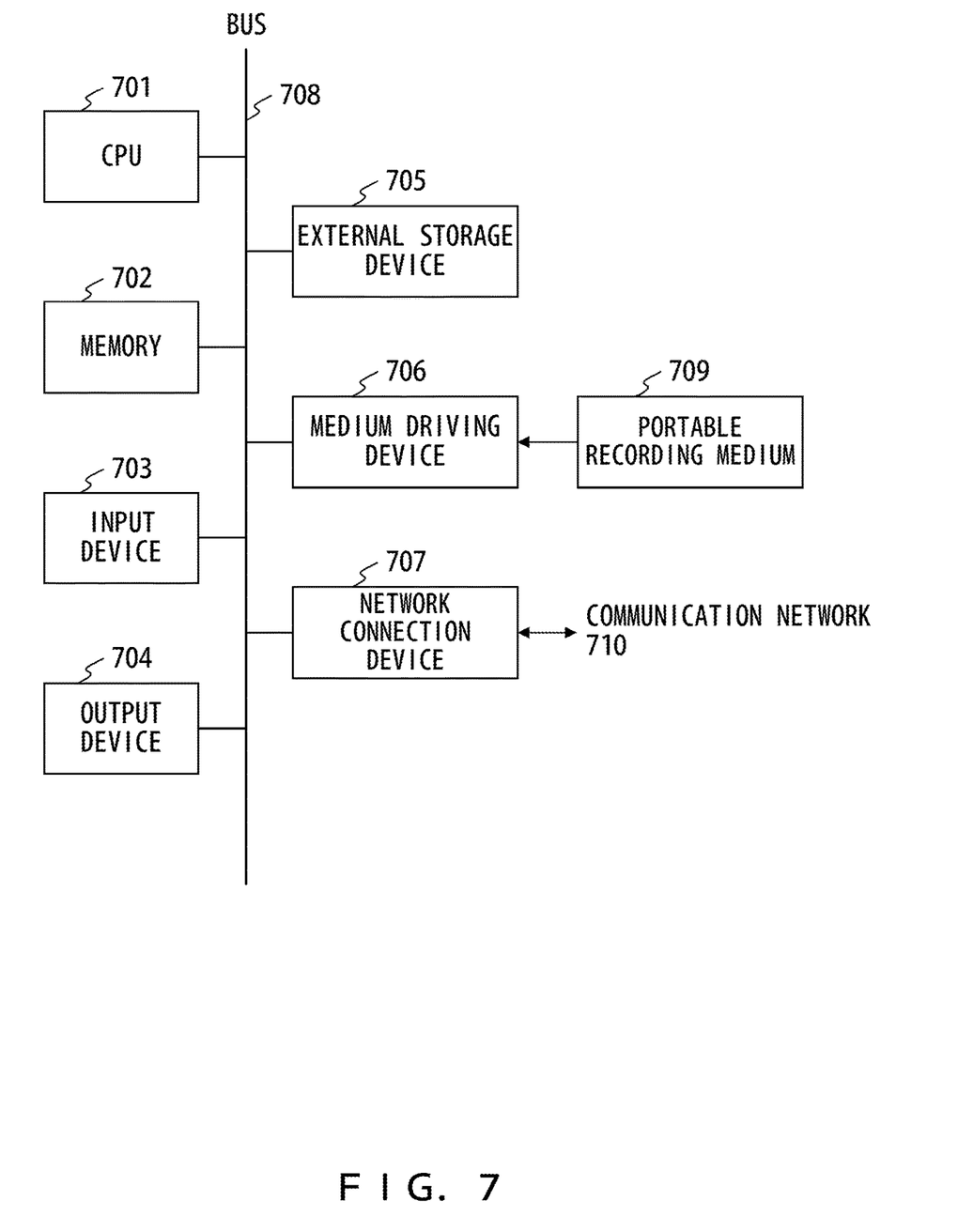
FIG. 7 illustrates a configuration of an information processing device.

FIG. 7 illustrates a configuration of an information processing device. The client device 20 in FIG. 2 and the server device 30 in FIG. 3 can be realized using, for example, the information processing device (computer) illustrated in FIG. 7. The information processing device in FIG. 7 includes a CPU (Central Processing Unit) 701, a memory 702, an input device 703, an output device 704, an external storage device 705, a medium driving device 706, and a network connection device 707. These are connected to each other via a bus 708.

The memory 702 is a semiconductor memory, such as a ROM (Read Only Memory), a RAM (Random Access Memory), or a flash memory, and stores a program and data used for the image display control process that is performed by the client device 20 and the server device 30. For example, the CPU 701 executes the program using the memory 702 so as to perform the image display control process described above.

The input device 703 is, for example, a keyboard, a pointing device, or the like, and is used for the input of an instruction or information from an operator. The output device 704 is, for example, a display device, a printer, a speaker, or the like, and is used for the output of an inquiry to the operator or a process result.

The external storage device 705 is, for example, a magnetic disk device, an optical disk device, a magneto-optical disc device, a tape device, or the like. The external storage device 705 also includes a hard disk drive. The information processing device can store a program and data in the external storage device 705, and can use the program and the data by loading them into the memory 702.

The medium driving device 706 drives a portable recording medium 709, and accesses the recorded contents of the portable recording medium 709. The portable recording medium 709 is a memory device, a flexible disk, an optical disk, a magneto-optical disk, or the like. The portable recording medium 709 also includes a Compact Disk Read Only Memory (CD-ROM), a Digital Versatile Disk (DVD), a Universal Serial Bus (USB) memory, or the like. The operator can store a program and data in the portable recording medium 709, and can use the program and the data by loading them into the memory 702.

As described above, a computer-readable recording medium that stores a program and data used for the image display control process includes a physical (non-transitory)

recording medium, such as the memory 702, the external storage device 705, or the portable recording medium 709.

The network connection device 707 is connected to a communication network 710, and is a communication interface that performs data conversion accompanying communication.

The information processing device can receive a program and data from an external device via the network connection device 707, and can use the program and the data by loading them into the memory 702.

According to the embodiments, a client device can immediately display a final still image of a series of moving images that a server device generates, even when a transmission delay occurs in a network to which the server device and the client device are connected.

The embodiments disclosed herein and the advantages thereof have been described in detail, but those skilled in the art could make various modifications, additions, or omissions without departing from the scope of the present invention specified in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A computer-readable, non-transitory medium having stored therein a control program for causing a client computer to execute a process, the process comprising:
    obtaining a series of operation instructions directed to an object;
    transmitting instruction information indicating the series of operation instructions to a server;
    receiving a plurality of data packets transmitted from the server upon receipt of the instruction information, the plurality of data packets representing a plurality of images arranged in a time series to represent a series of actions of the object that depend on the series of operation instructions;
    controlling a display device to display in a time series the plurality of images represented by the plurality of data packets;
    determining whether the series of operation instructions have been stopped;
    opening a second communication port that is different from a first communication port that communicates the plurality of data packets, between the server and the client computer, when it has been determined that the series of operation instructions have been stopped;
    transmitting, to the server via the first communication port, port identification information of the second communication port and a stopping signal indicating that the series of operation instructions have been stopped;
    receiving, via the second communication port, a final data packet that the server transmits in response to the stopping signal, the final data packet being one of the plurality of data packets that represents a final one of the plurality of images arranged in a time series; and
    controlling the display device to halt displaying of images represented by individual packets, from among the plurality of data packets, that are received after it has been determined that the series of operation instructions have been stopped, and to display the final image represented by the final data packet subsequent to displaying of an image at a time at which it is determined that the series of operation instructions have been stopped.

2. The computer-readable, non-transitory medium stored therein the control program according to claim 1, wherein the client computer closes the second communication port after the controlling to display the final image.

3. A computer-readable, non-transitory medium having stored therein a control program for causing a server computer to execute a process, the process comprising:
    receiving, from a client, instruction information indicating a series of operation instructions directed to an object;
    transmitting a plurality of data packets to the client upon receipt of the instruction information, the plurality of data packets representing a plurality of images arranged in a time series to represent a series of actions of the object that depend on the series of operation instructions;
    receiving, from the client, a stopping signal indicating that the series of operation instructions directed to the object have been stopped, and port identification information of a second communication port that the client opens between the server and the client when the client has determined that the series of operation instructions have been stopped, the second communication port being different from a first communication port that communicates the plurality of data packets; and
    transmitting, upon receipt of the stopping signal, a final data packet, via the second communication port, the final data packet being one of the plurality of data packets that represents a final one of the plurality of images arranged in a time series.

4. An information processing system comprising:
    a client that transmits, to a server via a network, a signal of an operation performed on an image, sequentially receives, via the network, image data packets that the server generates based on the signal of the operation, in response to acknowledgments, and displays images, the client including
        a first processor configured to execute a first process, the first process comprising:
            obtaining a series of operation instructions directed to an object;
            transmitting instruction information indicating the series of operation instructions to a server;
            receiving a plurality of data packets transmitted from the server upon receipt of the instruction information, the plurality of data packets representing a plurality of images arranged in a time series to represent a series of actions of the object that depend on the series of operation instructions;
            controlling a display device to display in a time series the plurality of images represented by the plurality of data packets;
            determining whether the series of operation instructions have been stopped,
            opening, between the server and the client, a second communication port that is different from a first communication port that communicates the plurality of data packets, when it has been determined that the series of operation instructions have been stopped;

transmitting, to the server via the first communication port, port identification information of the second communication port and a stopping signal indicating that the series of operation instructions have been stopped;

receiving, via the second communication port, a final data packet that the server transmits in response to the stopping signal, the final data packet being one of the plurality of data packets that represents a final one of the plurality of images arranged in a time series; and controlling the display device to halt displaying of images represented by individual packets, from among the plurality of data packets, that are received after it has been determined that the series of operation instructions have been stopped, and to display the final image represented by the final data packet subsequent to displaying of an image at a time at which it is determined that the series of operation instructions have been stopped; and a server that receives the signal of the operation transmitted from the client via the network, generates image data packets based on the signal of the operation, and sequentially transmits the image data packets to the client via the network in response to acknowledgments from the client, the server including
a second processor configured to execute a second process, the second process comprising:
receiving, from the client, the stopping signal and the port identification information from the client, and
transmitting, via the second communication port, the current still image at the time of the receiving of the stopping signal.

5. An image display control method that is performed by a client computer, the image display control method comprising:

obtaining a series of operation instructions directed to an object;

transmitting instruction information indicating the series of operation instructions to a server;

receiving a plurality of data packets transmitted from the server upon receipt of the instruction information, the plurality of data packets representing a plurality of images arranged in a time series to represent a series of actions of the object that depend on the series of operation instructions;

controlling a display device to display in a time series the plurality of images represented by the plurality of data packets;

determining whether the series of operation instructions have been stopped;

opening, between the server and the client computer, a second communication port that is different from a first communication port that communicates the plurality of data packets, when it has been determined that the series of operation instructions have been stopped;

transmitting, to the server via the first communication port, port identification information of the second communication port and a stopping signal indicating that the series of operation instructions have been stopped;

receiving, via the second communication port, a final data packet that the server transmits in response to the stopping signal, the final data packet being one of the plurality of data packets that represents a final one of the plurality of images arranged in a time series; and controlling the display device to halt displaying of images represented by individual packets, from among the plurality of data packets, that are received after it has been determined that the series of operation instructions have been stopped, and to display the final image represented by the final data packet subsequent to displaying of an image at a time at which it is determined that the series of operation instructions have been stopped.

6. An image display control method that is performed by a server computer, the image display control method comprising:

receiving, from a client, instruction information indicating a series of operation instructions directed to an object;

transmitting a plurality of data packets to the client upon receipt of the instruction information, the plurality of data packets representing a plurality of images arranged in a time series to represent a series of actions of the object that depend on the series of operation instructions;

receiving, from the client, a stopping signal indicating that the series of operation instructions directed to the object have been stopped and port identification information of a second communication port that the client opens between the server and the client when the client has determined that the series of operation instructions have been stopped, the second communication port being different from a first communication port that communicates the plurality of data packets; and transmitting, upon receipt of the stopping signal, a final data packet, via the second communication port, the final data packet being one of the plurality of data packets that represents a final one of the plurality of images arranged in a time series.

* * * * *